United States Patent
Pearce

(10) Patent No.: US 7,964,664 B2
(45) Date of Patent: Jun. 21, 2011

(54) GEL WITH WIDE DISTRIBUTION OF MW IN MID-BLOCK

(75) Inventor: Tony M. Pearce, Alpine, UT (US)

(73) Assignee: Edizone, LLC, Alpine, UT (US)

( * ) Notice: Subject to any disclaimer, the term of this patent is extended or adjusted under 35 U.S.C. 154(b) by 1243 days.

(21) Appl. No.: 11/345,622

(22) Filed: Feb. 1, 2006

(65) Prior Publication Data

US 2006/0194925 A1    Aug. 31, 2006

Related U.S. Application Data

(60) Provisional application No. 60/650,737, filed on Feb. 2, 2005.

(51) Int. Cl.
C08F 297/02 (2006.01)
C08F 297/00 (2006.01)

(52) U.S. Cl. ........ 524/543; 524/571; 524/575; 524/577; 5/652; 5/655.5

(58) Field of Classification Search .................... 525/95, 525/98, 89, 314, 326.1, 332.9, 333.3, 338; 524/505, 1, 543, 570, 577, 578, 579, 571, 524/575; 5/652, 653, 654, 655.4, 655.5
See application file for complete search history.

(56) References Cited

U.S. PATENT DOCUMENTS

| | | | |
|---|---|---|---|
| 5,760,117 A | 6/1998 | Chen | |
| 5,884,639 A | 3/1999 | Chen | |
| 5,962,572 A | 10/1999 | Chen | |
| 5,994,450 A * | 11/1999 | Pearce | 524/505 |
| 6,117,176 A | 9/2000 | Chen | |
| 6,148,830 A | 11/2000 | Chen | |
| 6,329,459 B1 * | 12/2001 | Kang et al. | 524/505 |
| 6,333,374 B1 | 12/2001 | Chen | |
| 6,552,109 B1 | 4/2003 | Chen | |
| 6,867,253 B1 | 3/2005 | Chen | |

FOREIGN PATENT DOCUMENTS

WO    WO-9305113 A1 *    3/1993
WO    WO-9621549 A1 *    7/1996

OTHER PUBLICATIONS

Bueche, F. "Melt Viscosity of Polymers: Effect of Polydispersity" Journal of Polymer Science vol. XLIII, pp. 527-530 (1960).*
Product Information Sheet for Kraton G1651 published by Kraton Polymers Inc.*
Kraton Polymers, Inc. "An Introduction to KRATON Polymers Issue 3" published in 2003.*

* cited by examiner

Primary Examiner — Irina S. Zemel
Assistant Examiner — Jeffrey Lenihan
(74) Attorney, Agent, or Firm — TraskBritt

(57) ABSTRACT

A gelatinous elastomer comprising an A-B-A triblock copolymer and a plasticizer useful, for example, in casting fine-detail molds at a low processing temperature. The gelatinous elastomer comprises copolymer molecules having a molecular weights generally evenly distributed across a range of molecular weights rather than having a relatively narrow molecular weight distribution centered about a single molecular weight. The A-B-A triblock copolymer may include SEBS, SEEPS, or other triblock copolymers. The plasticizer may include mineral oil or other plasticizing fluids.

11 Claims, No Drawings

GEL WITH WIDE DISTRIBUTION OF MW IN MID-BLOCK

PRIORITY

Priority is hereby claimed to U.S. Provisional Patent Application Ser. No. 60/650,737 filed on Feb. 2, 2005.

FIELD

The subject matter hereof relates to gelatinous elastomer materials, and the molecules from which they are made.

BACKGROUND

Much work has been done in the field of gelatinous elastomers. U.S. Pat. No. 5,994,450 by inventor Tony M. Pearce, which is hereby incorporated by reference, discloses gelatinous elastomers ("gel") made from a plasticizer or plasticizing fluid, such as mineral oil, and an A-B-A triblock copolymer, such as styrene-ethylene-ethylene-styrene (SEEPS). The copolymer is plasticized so that at least some of the plasticizer associates with the mid block B. An alternative A-B-A triblock copolymer is styrene-ethylene-butylene-styrene (SEBS) as taught in U.S. Pat. No. 4,369,284 by John Y. Chen, which is hereby incorporated by reference. Most makers of gelatinous elastomer materials and articles today express a strong preference for gels made with SEEPS rather than SEBS due to superior strength and elongation, reduced oil bleed, and other desirable material properties.

SEBS polymers are made by a number of suppliers, including SEPTON® Company of America in Pasadena, Tex. as well as its parent company, Kuraray in Japan. SEBS polymers are also available from KRATON® Polymers, Inc. of Houston, Tex. However, SEEPS polymers are made only by one supplier, SEPTON® Company of America in Pasadena, Tex., and its parent company in Japan. Thus it would be advantageous to have a SEBS polymer that had, in comparison to SEEPS, similar or better strength and elasticity properties, similar or better non-bleed properties, and similar or better other properties, in a gel.

Ordinarily, makers of this A-B-A tri-block copolymer strive to have a narrow range of molecular weight in a given polymer. Then, they offer a number of different polymers, each with its own range of molecular weights. If a user desires to have some of the properties of two or more different molecular weights, the user would mix two or more polymers together. However, in my use of such mixing, I have not found that the resultant gel is desirable.

For example, I have mixed SEPTON® 4055 (a high molecular weight "Mw" SEEPS polymer) with SEPTON® 4044 (a medium molecular weight SEEPS polymer) and SEPTON® 4033 (a low molecular weight SEEPS polymer), then heat-blended these together with mineral oil and cooled the mixture into a cohesive gel. This would be considered a trimodal gel because the molecular weights of the polymers are centered around 3 different points. While the resultant gel is easier to fill into molds because of its lower melt viscosity, the structural properties of the resultant mixed-polymer gel have been inferior to gels made with SEPTON® 4055, SEEPS polymer, alone (a unimodal gel). I believe that the low molecular weight polymers reach their maximum elongation before the medium and high molecular weight polymers, and fail before the other polymers become strained, thus drastically reducing tensile strength and elongation at failure of the gel. Therefore I concluded that merely mixing various molecular weights of SEEPS triblock copolymers did not yield a desirable gel.

DETAILED DESCRIPTION

I have discovered that a gel made by combining the mineral oil with a single SEBS polymer wherein at least the EB block of the molecules have a particular range or distribution of molecular weights forms an advantageous gel with properties that match or nearly match a gel made with SEEPS having a molecular weight of 300,000 or more (SEPTON® 4055 and mineral oil may be used to achieve such a gel). One such polymer is that of KRATON® Polymers, Inc. called KW-1000, a SEBS copolymer. For convenience, I will hereafter refer to gels made by mixing such polymers with a range of molecular weight within the same polymer with mineral oil as "wide molecular weight gels." As used herein, wide molecular weight gels have a generally even distribution of molecular weights across a particular spectrum, rather than having substantial peaks at certain molecular weights (as in the trimodal gel above).

In doing my experiments, I found that there are other significant advantages to wide molecular weight gels in addition to finding an SEBS polymer that rivaled SEEPS in performance in gels. The first significant advantage is that the wide molecular weight gels process at a much lower temperature than traditional SEEPS or SEBS gels. For example, a 3:1 oil:SEBS (KW-1000) gel processes in an extruder at about 250 degrees F. A 3:1 oil:SEPTON®-4055 SEEPS gel would process at about 350 degrees F. This extra 100 degrees F. is undesirable because it can cause significant oxidative degradation during processing, particularly in batch processing. The second significant advantage is that even at the lower processing temperature, the wide molecular weight gel made has a considerably lower melt viscosity. I do not have the equipment to measure melt viscosity quantitatively, but the 3:1 molten SEEPS gel at 350 degrees F. is not suitable for pour-casting into fine-detail molds, whereas the molten wider molecular weight gel can be easily pour-cast into a fine-detail mold at much less than 350 degrees F.

For use herein, a wide molecular weight gel can be any gel using an A-B-A triblock copolymer where the molecular weight of at least the B block is distributed across a range rather than being centered around a particular molecular weight. For example, SEPTON® 4055 is an A-B-A triblock copolymer of the SEEPS configuration with a molecular weight centered around 300,000 molecular weight. KRATON® G1651 is an A-B-A triblock copolymer of the SEBS configuration with a molecular weight centered around 200,000. Neither of these falls within the scope of a wide molecular weight gel because the molecular weight of the copolymer is centered about a single data point.

| Copolymer | Molecular Weight range | % Copolymer within molecular weight range |
| --- | --- | --- |
| SEBS | 100,000 to 250,000 | 80% |
| SEBS | 150,000 to 225,000 | 90% |
| SEBS | 200,000 to 260,000 | 75% |
| SEBS | 200,000 to 225,000 | 65% |
| SEEPS | 160,000 to 300,000 | 85% |
| SEEPS | 150,000 to 400,000 | 95% |

For any one of these wide molecular weight gels, if any particular data point is chosen, such as a molecular weight of the copolymer of 250,000, not more than about 50% of the copolymers match that data point. In some embodiments, more than 50% of the copolymer will fall within the stated molecular weight range, in some embodiments more than 60%, in some embodiments more than 70%, in some embodiments more than 80%, in some embodiments more than 90%. Molecular weights for an SEBS copolymer are expected to be within the range of 100,000 to 300,000, or within the range of 125,000 to 275,000, or within the range of 150,000 to 250,000 or within the range of 200,000 to 275,000, or within the range of 200,000 to 250,000, or within the range of 200,000 to 225,000, or otherwise widely distributed.

To date my testing does not show significant disadvantages to the wide molecular weight gel in comparison to traditional SEEPS gels when used at room temperature. Traditional SEEPS gels will have an advantage in retaining shape at high temperatures, such as in the trunk of a car in Arizona in the summertime. Traditional SEEPS gels also appear to be somewhat stronger in tensile strength, though both gels are exceptionally strong for a soft elastomer. Both gels in, for example, a 4:1 oil:polymer ratio do not bleed oil, though in both cases oil can be forced out through capillary attraction if the gel is placed for several hours next to a wicking source such as paper. When against fabric, such as a cushion cover, no bleed occurs. In a test where a 0.5 inch×0.7 inch piece of wide molecular weight SEBS gel in an 8:1 oil:polymer ratio was put on a piece of regular photocopy paper overnight, the oil had been wicked sufficiently to leave a stain 0.25 inches out from the edges of the KW-1000 sample, and 0.45 inch out from the SEEPS gel sample. Lower oil:polymer ratios showed the stain as similar between the two gels. This shows a measurable advantage of the wide molecular weight gel over traditional SEEPS gels in oil retention in high oil:polymer ratios. Both gels appear to be less tacky than most prior art gels, and less tacky than the traditional SEBS gel. The wide molecular weight gel does appear to have higher tensile strength than traditional SEBS gels. Both gels are very resistant to compression set at room temperature, and if overstressed are able to recover or largely recover from compression set, and both gels (traditional SEEPS gel and wide molecular weight gel) are better in this regard than most prior art gels. In summary, while traditional SEEPS gels may have a slight edge in final properties, the wide molecular weight gels are very close in performance and are much better than other prior art, while at the same time processing at lower temperatures and/or at lower melt viscosities.

Because the wide molecular weight gels can be processed at lower temperatures and/or at lower melt viscosities, they can more easily be incorporated with microspheres that have a polymer shell. Heretofore gels with properties as good or nearly as good as traditional SEEPS gels and containing polymer microspheres, especially those with lower oil:polymer ratios (as a non-limiting example 2.5:1) could not be molded under pressure into molds, and pressure is generally required for finer-detail molds or longer-flow-distance molds. This is because the melt temperature must be high and the molding pressure must be high, either one of which can serve to destroy ("pop") the polymer-shell microsphere. Example of such microspheres include acrylic microspheres such as are made by Matsumoto of Japan and Expancel of Sweden. Even glass and other non-polymer microspheres often pop under the high pressure required to mold quality gels such as traditional SEEPS gels. Microspheres can offer several advantages to gels, including without limitation lower density of the gel, lower heat/cold transfer, lower oil bleed or oil wick-out, improved throughput in a melt blending screw (for example an extruder screw) and a silky feel with less friction.

All the gel components mentioned in U.S. Pat. No. 5,994, 450 (which is hereby incorporated by reference) can be used in various combinations in the wide molecular weight gels hereof. Additives to the gel can be used in greater quantities in the wide molecular weight gels because of the lower processing temperature and melt viscosity. For examples without limitation, flame retardants, antioxidants, colorants, antibleed additives (such as Zonyl-BAN), extenders, fillers, and reinforcers. As an example of an improvement, less antioxidant needs to be used. As another example of an improvement, the colorants used will not lose their color as much as at higher temperatures.

Another aspect of the wide molecular weight gels is the combining of wider molecular weight gels with any other type of copolymer in which an elastomer mid-block or end-block or other block is combined in the polymer with polystyrene. The polystyrenes of the wider molecular weight gel will combine with the polystyrene of the other type of copolymer to give a blend of the properties of wider molecular weight gel alone and a gel made with that other copolymer. In general, it is anticipated that the wider molecular weight copolymer will improve the structural properties as compared with a gel made with oil and that other copolymer alone, while the other copolymer will impart a desired property to the blend, which is inherent to that other copolymer. A particular embodiment as described in this paragraph is the combining of wider molecular weight gels with SEEPS polymers such as SEPTON® 4055 or SEPTON® 4077. This mixed polymer can offer lower melt viscosity and lower processing temperature than traditional SEEPS gels, while giving more heat stability than wider molecular weight gels alone. Since both the wider molecular weight SEBS of this disclosure and SEEPS have styrene end caps, they will combine to make a polymer with these advantages.

The tailorability of physical properties of the materials of the present invention makes them useful in many different product applications. Thin layers of the materials may be used as padding or backing for carpets and rugs. In construction, the materials are useful for temporary roof repair, as an undercoating to prevent roof leakage and provide insulation, in paint masking applications, and as a thin shatter resistant layer between windowpanes.

Extremely thin layers are useful as films and related barrier-type products. For example, the material of the invention could be used as plastic wrap, in protective covering applications, in condoms, disposable gloves, balloons and the like.

The materials are also useful in a wide variety of cushioning applications. When a deforming force is applied to the composite material of the invention, the material readily deforms. When placed under a compression force, the material tends to exhibit a flowing or fluid-like movement away from the compression force. Deformation of the material of this invention causes it to conform to protrusions on the object being cushioned. This deformation occurs because of the flowing movement of the elastomeric substance. The deformability, flowing and conformability of the material of the invention act together to provide a supporting force against the object being cushioned which is roughly equalized across the irregularly shaped supporting surface of the cushion. In other words, when used in cushioning applications, the soft elastomeric material of the invention avoids placement of significantly high pressure on protrusions of the object being supported. After a deforming force has been removed from the preferred material of the present invention, the elastomeric material rebounds nearly instantaneously to substantially its original size and shape.

As an example of the use of the composites of the present invention as a cushion, in shoes, the material of the invention would be useful as shoe insoles and inserts. It could also be used in furniture cushions, mattresses, floor mat pads, car seat cushions, bicycle seat cushions, shoulder strap cushions, stadium cushions, wheelchair cushions, prosthesis pads, crutch pads, motor mount cushions, pads for vibration dampening of machines, computer mouse, keyboard and wrist pads, and padding in protective gear, to name only a few cushioning uses for the material.

The readily deformable visco-elastic material of the present invention is also useful in medical applications, including but not limited to use as wraps, bandages, and hot/cold packs. It could also be used for various purposes in toys, especially dolls, such as making toys that are durable, yet pleasant to touch and stretch. Many other applications not detailed herein can also make use of the properties of the material of the invention.

While the present invention has been described and illustrated in conjunction with a number of specific embodiments, those skilled in the art will appreciate that variations and modifications may be made without departing from the principles of the invention as herein illustrated, described, and claimed. The present invention may be embodied in other specific forms without departing from its spirit or essential characteristics. The described embodiments are to be considered in all respects as only illustrative, and not restrictive. All changes, which come within the meaning and range of equivalency of the claims are to be embraced within their scope.

I claim:

1. A gelatinous elastomer cushion for cushioning a body of a person, comprising:
   styrene-ethylene-butylene-styrene triblock copolymer molecules, and
   a plasticizer,
   the triblock copolymer molecules and the plasticizer being mixed to form a gelatinous elastomer shaped to form the cushion for cushioning a body of a person,
   wherein at least 80% of the triblock copolymer molecules have molecular weights generally evenly distributed between 150,000 and 250,000, and wherein no more than 50% of the styrene-ethylene-butylene-styrene triblock copolymer molecules have any one molecular weight between 150,000 and 250,000.

2. The gelatinous elastomer cushion of claim 1, wherein the gelatinous elastomer has a lower melt viscosity than another gelatinous elastomer, the another gelatinous elastomer comprising the same ratio of styrene-ethylene-butylene-styrene triblock copolymer and plasticizer as the gelatinous elastomer, and having a relatively narrow molecular weight distribution centered around a single molecular weight within a range extending from 150,000 to 250,000.

3. The gelatinous elastomer cushion of claim 1, wherein the gelatinous elastomer has a lower processing temperature than another gelatinous elastomer, the another gelatinous elastomer comprising the same ratio of styrene-ethylene-butylene-styrene triblock copolymer and plasticizer as the gelatinous elastomer and having a relatively narrow molecular weight distribution centered around a single molecular weight within a range extending from 150,000 to 250,000.

4. The gelatinous elastomer cushion of claim 1, further comprising microspheres.

5. A gelatinous elastomer cushion for cushioning a body of a person, comprising:
   styrene-ethylene-butylene-styrene triblock copolymer molecules, and
   a plasticizer,
   the triblock copolymer molecules and the plasticizer being mixed to form a gelatinous elastomer and shaped to form the cushion for cushioning a body of a person,
   wherein at least 80% of the triblock copolymer molecules have molecular weights generally evenly distributed between 100,000 and 300,000, and wherein a distribution of the molecular weights of the triblock copolymer molecules between 100,000 and 300,000 is not centered about a single data point.

6. The gelatinous elastomer cushion of claim 5, wherein the gelatinous elastomer has a lower melt viscosity than another gelatinous elastomer, the another gelatinous elastomer comprising the same ratio of triblock copolymer and plasticizer as the gelatinous elastomer, and having a relatively narrow molecular weight distribution centered around a single molecular weight within a range extending from 100,000 to 300,000.

7. The gelatinous elastomer cushion of claim 5, wherein the gelatinous elastomer has a lower processing temperature than another gelatinous elastomer comprising the same ratio of triblock copolymer and plasticizer as the gelatinous elastomer and having a relatively narrow molecular weight distribution centered around a single molecular weight within a range extending from 100,000 to 300,000.

8. A gelatinous elastomer cushion for cushioning a body of a person, comprising:
   styrene-ethylene-butylene-styrene triblock copolymer molecules, and
   a plasticizer,
   the triblock copolymer molecules and the plasticizer being mixed to form a gelatinous elastomer and shaped to form the cushion for cushioning a body of a person,
   wherein at least 95% of the triblock copolymer molecules have molecular weights generally evenly distributed between 150,000 and 400,000, and wherein no more than 50% of the styrene-ethylene-butylene-styrene triblock copolymer molecules have any one molecular weight between 150,000 and 400,000.

9. The gelatinous elastomer cushion of claim 8, wherein the gelatinous elastomer has a lower melt viscosity than another gelatinous elastomer, the another gelatinous elastomer comprising the same ratio of styrene-ethylene-butylene-styrene triblock copolymer and plasticizer as the gelatinous elastomer, and having a relatively narrow molecular weight distribution centered around a single molecular weight between the first molecular weight and the second molecular weight.

10. The gelatinous elastomer cushion of claim 8, wherein the gelatinous elastomer has a lower processing temperature than another gelatinous elastomer, the another gelatinous elastomer comprising the same ratio of styrene-ethylene-butylene-styrene triblock copolymer and plasticizer as the gelatinous elastomer and having a relatively narrow molecular weight distribution centered around a single molecular weight between the first molecular weight and the second molecular weight.

11. The gelatinous elastomer cushion of claim 8, further comprising microspheres.

* * * * *